United States Patent [19]

Olkkola

[11] Patent Number: 6,041,120

[45] Date of Patent: Mar. 21, 2000

[54] INSTALLATION AND ASSEMBLY HOLDING MAT FOR A TELEPHONE

[75] Inventor: Jari Olkkola, Salo, Finland

[73] Assignee: Nokia Mobile Phones Limited, Espoo, Finland

[21] Appl. No.: 08/874,800

[22] Filed: Jun. 13, 1997

Related U.S. Application Data

[63] Continuation of application No. 08/529,018, Sep. 15, 1995, abandoned.

[30] Foreign Application Priority Data

Sep. 16, 1994 [FI] Finland ................................ 944300

[51] Int. Cl.[7] ............................................ H04M 1/00
[52] U.S. Cl. ......................... 379/433; 379/429; 379/368
[58] Field of Search .................... 379/433, 428, 379/429, 368, 369, 370, 434; 455/575, 90

[56] References Cited

U.S. PATENT DOCUMENTS

| | | | |
|---|---|---|---|
| 4,291,202 | 9/1981 | Adams et al. .................... | 179/103 |
| 4,634,818 | 1/1987 | Hayes-Pankhurst et al. .......... | 200/5 A |
| 5,081,674 | 1/1992 | Wijas et al. ..................... | 379/433 |
| 5,138,119 | 8/1992 | Demeo ............................ | 200/5 A |
| 5,235,636 | 8/1993 | Takagi et al. .................... | 379/429 |

FOREIGN PATENT DOCUMENTS

| | | |
|---|---|---|
| 39 23959 | 10/1990 | Germany . |
| 2271 038 | 3/1994 | United Kingdom . |

*Primary Examiner*—Jack Chiang
*Attorney, Agent, or Firm*—Perman & Green, LLP

[57] ABSTRACT

A hand telephone includes inside its cover a printed circuit board (4) with components, and a display (2) and an earpiece (3) as separate components. According to the invention, the printed circuit board (4) and at least part of the separate components (2, 3) are mounted on an installation mat (1) of an elastic material forming a continuous mounting and attachment base without any other attaching means. The installation mat (1) is at the same time an integrated part of the keypad (9) of the hand telephone. The installation mat packs (13) the components (2, 3) against the casing and at the same time serves as a shock absorber.

15 Claims, 2 Drawing Sheets

INSTALLATION AND ASSEMBLY HOLDING MAT FOR A TELEPHONE

This application is a continuation of application(s) Ser. No. 08/529,018 filed on Sep. 15, 1995, now abandoned.

INSTALLATION MAT

The invention relates to a hand telephone according to the preamble of claim 1, and particularly to the sealing of the telephone or the installation space for the components of its handset, the installation of parts, and the installation mat which is part of the keypad of the telephone.

Here the word 'hand telephone' covers a wide range of meanings, so that it can be e.g. the handset of a telephone, the hand phone of a radio telephone, the handset of a mobile station, a mobile telephone, a pocket telephone, or a similar device. These devices usually include as separate components a microphone, an earpiece, push-buttons in the form of numeric keypads and other keys, a numeric or alphanumeric display etc., and a printed circuit board with the necessary electronic circuits.

In known hand telephones, separate components are installed in the body in various ways, e.g. using separate auxiliary frames. In current solutions, it is also difficult to seal the body well. It is often used separate packer rings or sealing tapes which do not always provide a reliable tightness against ambient particles, dust and humidity.

Current hand telephones usually use membrane keypads and one problem related to these is the correct installation of the keys and how to hold them in position; especially, how to have the outermost keys stay at the correct height with respect to the front cover of the body.

It is a disadvantage of these solutions that, in the assembly, several different components have to be handled that are often made of different materials as well. In practice, the attachment of separate parts requires a lot of manual labour which is expensive, as is well known. Because of rigid attachments the components of a hand telephone, particularly the display, may get damaged if the telephone is bumped against a hard object.

It is an object of this invention to remove the above-mentioned disadvantages and at the same time provide a simple and advantageous method for assembling a hand telephone.

The above-mentioned objective is attained with the characteristics of claim 1. According to the invention, the installation mat provides a common, integrated installation base for the components of the hand telephone, thus avoiding the use of auxiliary frames and separate fixing means for the components. As the installation mat is made, according to the invention, of an elastic material, it protects the components against external impacts and twisting. The elastic material may be rubber or plastic with suitable compressibility characteristics, which, when compressed between the front and rear part of the body, provides a good packing between the parts and eliminates eventual gaps.

Advantageously, an installation mat according to the invention is part of the keypad of the hand telephone. Then the installation mat may include key-shaped protuberances, or nodules, which according to the principle of the known membrane keypad act on the electronic circuits of the keypad, such as capacitance switches or other coupling elements on the printed circuit board installed on the other side of the installation mat. The edges of the installation mat that lie against the side of the body may form a continuous bulge that provides a good support for the outermost keys of the keypad.

The installation mat may also serve as a mounting base and packing for the display, microphone and/or earpiece. Then the installation mat may include a suitably fashioned cup-like "mounting hole" including the surrounding edges, where e.g. an earpiece can be easily installed. Then the earpiece is steadily positioned and, at the same time the edges of the hole in the installation mat encircling the edges of the earpiece provide a good packing and shock elimination between the earpiece and the body of the hand telephone. The display circuit can be mounted in the same manner. In addition, the edges of the installation mat over the edges of the display can be used to border the display area, in which case a separate border print on the glass of the display circuit is not needed.

Since, according to the invention, the installation mat is made of an elastic material e.g. by injection moulding, pressing a sheet of material, or in any other known way, the installation method improves the impact resistance of the hand telephone and also wider tolerances are allowed in the positioning of components. Thanks to the elasticity of the installation mat the separate components mounted in the installation mat may have wider tolerances both in the vertical and horizontal direction so that these components are better fitted against the body. In fact, with this installation method, the separate components are "self-positioning". This enables automatic installation with simple means.

A special advantage of the invention is that during the assembly the separate components attached to the installation mat are "self-attaching". As for manufacturing, the installation mat enables the use of an application according to the in-one-go principle as all or at least the major part of the components of a hand telephone can be mounted on the installation mat in one work stage.

Naturally, the installation mat according to the invention can also be used in such a way that part of the separate components are assembled in the conventional manner in the auxiliary frame which then is installed into the installation mat as a separate component.

The installation mat according to the inventions allows for more freedom as to the pad configuration. Also a resonator cavity can be incorporated in connection with the beeper so as to amplify the signal thereof.

Below, the invention is described in more detail using an example of an embodiment of a hand telephone, with reference to the enclosed drawings, where

DETAILED DESCRIPTION OF THE PREFERRED EMBODIMENT

Figure 1:
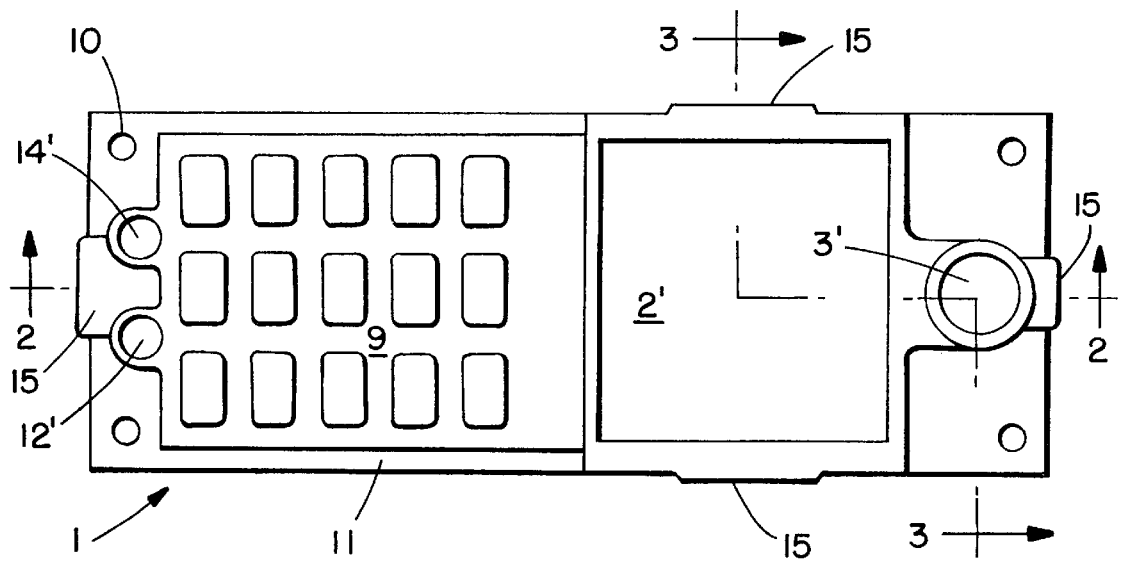
FIG. 1 shows a top view of an installation mat according to the invention.
Figure 1A:
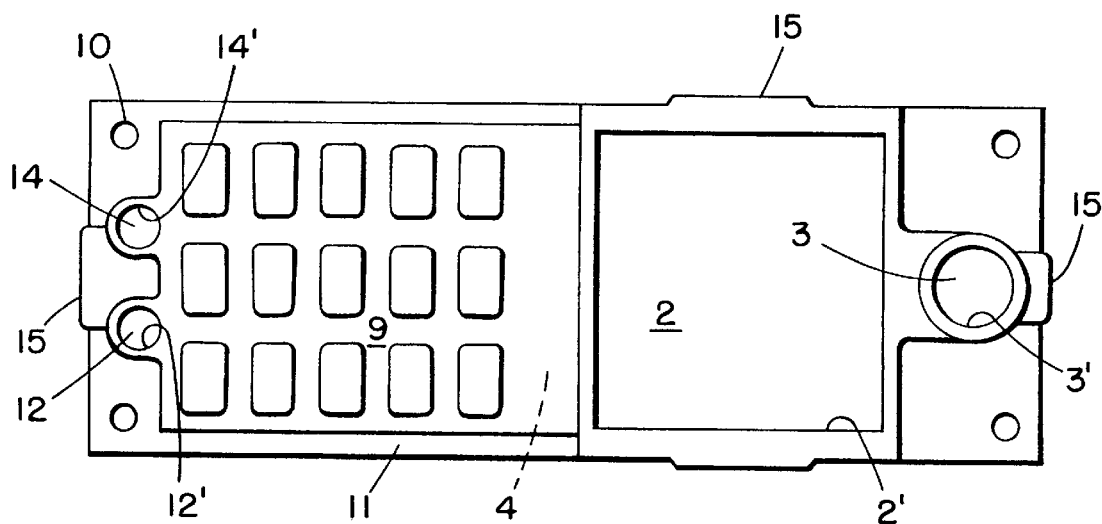
FIG. 1A is a top view of the mat shown in FIG. 1 with electronic components attached to the mat to form an assembly.
Figure 2:
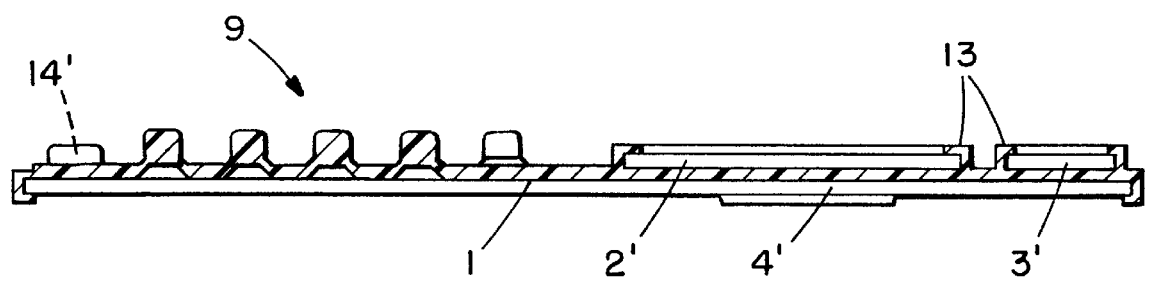
FIG. 2 shows a longitudinal section of the installation mat of FIG. 1 along the centre line B—B and the separate components mounted on the installation mat.
Figure 3:
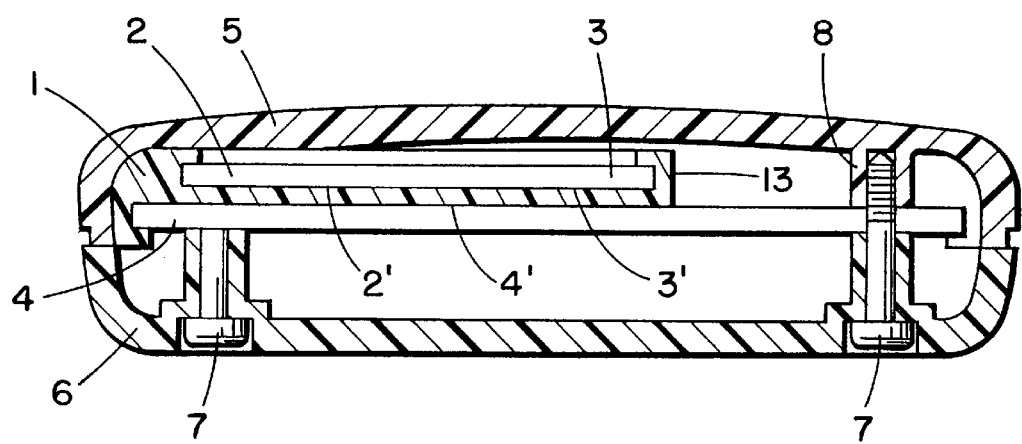
FIG. 3 shows a cross section of the installation mat of FIG. 1 along the line A—A, when the installation mat has been installed in the body of a hand telephone.

The installation mat 1 shown in FIGS. 1 to 3 made of an elastic material provides a continuous mounting base for the components of a hand telephone. FIG. 1 shows the structure of the installation mat 1 seen from above. FIG. 1A shows the mat 1 with electronic components 2, 3, 4, 12, 14 attached to the mat to form an assembly. The mat includes mounting holes 2', 3', 14' and 12' for a display 2, earpiece 3, microphone 14 and beeper 12. The mat 1 also has a hole or receiving area 4' for a printed circuit board 4 (see FIG. 3). The keypad 9 is made using the installation mat. In the corners of the installation mat 1 there are mounting holes 10, and at least around the keypad but advantageously around the whole installation mat there are thickened edges 11 which can be better seen in the cross section in FIG. 3.

FIG. 2 shows a longitudinal section along the centre line B—B, illustrating the installation mat 1 shown in FIG. 1. This figure shows more closely the structure of the "mounting holes" 2', 3', 4' and 14' in the installation mat for a display 2, an earpiece 3, a printed circuit board 4, and a microphone 14. It can be seen that the holes in the installation mat are encircled by edges 13 that overlap the edges of the component installed in the hole and thus hold the component in position. For keys 9 the installation mat 1 includes elevated nodules that can be clearly seen in this cross section. The mounting nodules 15 in the ends of the installation mat hold the installation mat in position with respect to the keypad circuitry on the printed circuit board. In this figure it can be seen that the installation mat 1 effectively holds the separate components 2, 3, 4, 14 in position without any other separate attaching means. With a suitable dimensioning of the edges 13 of the mounting holes the components 2, 3, 4, 14 can move a little sideways so that they can be positioned at the possible guide profiles of the body 5, 6. With a suitable thickness of the installation mat 1 between the bottoms of the components 2, 3, 14 and the printed circuit board 4 the thickness tolerances for the body parts 5, 6 and the separate components 2, 3, 4, 14 can be somewhat bigger than usual and yet the attachment and packing of the components will be firm and reliable. Separate auxiliary frames are not needed for mounting the separate components 2, 3, 9, 13, 14.

FIG. 3 is a cross-sectional presentation of the installation mat 1 mounted in the body of a hand telephone. The body includes a front part 5 and a rear part 6, and the installation mat 1 is mounted between them in a sealing fashion, on the mounting structures 8 of the body, and fastened with screws 7 or similar fasteners. The display 2, earpiece 3, microphone 14 and beeper 12 are held tightly in position between the printed circuit board 4 and the front part of the body, and between the bottoms of the components 2, 3, 12, 14 and the printed circuit board 4 there is part of the installation mat 1, and between the upper surfaces of the components 2, 3, 12, 14 and the front part 5 of the body there is an edge 13 surrounding the component and the component hole in the installation mat. This edge 13 packs the component and protects it against humidity and dust, for example. In addition, the edge 13 and the part of the installation mat under the bottom of a component act as an efficient absorber, protecting the component 2, 3, 12, 14 against impacts and twisting.

FIGS. 2 and 3 show that the edge 13 of the installation mat 1 can be efficiently utilized with respect to the display 2 so that the edge 13 borders the edges of the display, in which case it is possible to leave out the nowadays customary border print of the display without impairing the appearance of the display. By choosing a suitable color for the material of the installation mat it is possible to create different appearance alternatives in an advantageous manner.

The integrated mounting base, or the installation mat 1, shown in FIGS. 1 to 3, can be manufactured by injection moulding, pressing a sheet of plastic, or in any other known way. The material should be suitably elastic and flexible, such as rubber or elastic plastic which, however, is sturdy enough, so that the edges 13 of the mounting holes in the installation mat 1 hold the installed components reliably in position. A person skilled in the art will know several suitable materials and methods for manufacturing an installation mat such as the one shown in FIGS. 1 to 3 and, therefore, a further discussion of such materials and methods will not be included here. However, let it be mentioned that the manufacturing of the installation mat according to the invention e.g. by pressing is simple and the resulting mounting base is impact resistant and elastic as well as cheap to manufacture.

The hand telephone in the embodiment example can be assembled e.g. in the following order. The required separate components are mounted in the mounting holes of the installation mat 1—in our example, these are the display 2, earpiece 3, microphone 14 and beeper 12. The required electronic components (not shown) are assembled elsewhere on the printed circuit board 4 in a known manner—surface mounted, for example. The complete printed circuit board 4 is mounted in its mounting hole and the required conductors are connected to the printed circuit board. The resulting whole (1–4 in FIG. 3) is placed in a cover, ie. the front part 5 of the body, against the mounting structures 8, and the other cover, ie. the rear part 6 of the body, is pressed onto the resulting whole. The parts 5, 6 of the cover are attached to each other with screws mounted from the part 6 side. Then the installation mat 1 receives the pressing force of the cover and is packed between the cover 5 and the printed circuit board 4. The outer edges 11 of the installation mat 1 can be suitably fashioned, so that in the assembly they will be compressed between the printed circuit board 4 and at least the cover 5, possibly also against the cover 6 (not shown). Then the thickened edges 15 of the installation mat keep the installation mat in its position in relation to the circuit board 4. At the same time, there will be an efficient packing between the separate components 2, 3 and the cover 5. With a suitable fashioning of the installation mat 1 it is possible to obtain, if necessary, a packing (not shown) for the seam between the front part 5 and rear part 6 of the body.

On the basis of the above description of the assembly it can be seen that the integrated installation mat according to the invention forms a simple whole. Compared to the conventional assembly of a hand telephone, many installation and attachment phases can be left out, so the use of the installation mat saves both time and costs.

With a suitable fashioning of the installation mat it is possible to achieve a slightly compressible and elastic structure which is not susceptible to all impacts.

I claim:

1. In a hand telephone having a body, a printed circuit board located inside the body, and at least one electrical component electrically connected to the printed circuit board, the body having an aperture proximate the component, wherein the improvement comprises:
   a one-piece mat located inside the body, the mat having the printed circuit board fixedly connected onto a first side of the mat and the electrical component located in a hole in the mat at an opposite second side of the mat, wherein the mat is securely mounted between two parts of the body and forms a sealing packing between the two parts of the body.

2. A hand telephone as in claim 1 wherein the mat is attached to side edges of the printed circuit board.

3. A hand telephone as in claim 1 wherein the mat has a plurality of holes with a plurality of electrical components located in the holes.

4. A hand telephone of claim 1 wherein the installation mat constitutes part of a keypad of the hand telephone.

5. A hand telephone as in claim 1 wherein the components mounted on the installation mat include an earpiece and a microphone.

6. A hand telephone as in claim 1 wherein the components mounted on the installation mat include a display.

7. A hand telephone of claim 6 wherein the installation mat forms an edge bordering a display area of the display.

8. A hand telephone as in claim 1 wherein the installation mat is manufactured as a one-piece part made of rubber using injection molding or of elastic plastic using compression molding.

9. In a hand telephone having a body, electronic circuitry located inside the body, and a plurality of apertures in the body proximate electronic components of the electronic circuitry, wherein the improvement comprises:

a mat having a plurality of holes with the electronic components located in the holes, the mat contacting the body proximate the apertures and having portions sandwiched between the body and the electronic components, wherein the mat is comprised of resilient material to function as a shock absorber and forms a sealing packing with the body.

10. A hand telephone as in claim 9 wherein the portions include rim edges that extend into the holes.

11. A hand telephone as in claim 9 wherein the mat has mounting nodules that hold the mat on a printed circuit board.

12. A hand telephone as in claim 10 wherein the rim edges hold the components in the holes without additional attachments.

13. A portable telephone assembly platform mat comprising:

a first section with a printed circuit board receiving area; and a second section with an electronic component receiving area, wherein the printed circuit board receiving area is on a first side of the mat and the electronic component receiving area is on an opposite second side of the mat and, wherein a printed circuit board can be mounted to the mat in the printed circuit board receiving area, an electronic component can be connected to the mat in the electronic component receiving area to sandwich a portion of the mat between the printed circuit board and the electronic component and, the mat, the board and the component can be inserted as a modular assembly into a body of a portable telephone, and wherein the mat forms a sealing packing with the body.

14. A mat as in claim 13 wherein the mat has mounting nodules that attach to edges of the printed circuit board to hold the mat on the printed circuit board.

15. A mat as in claim 14 wherein the mat has an inwardly projecting edge at the component receiving area to hold the electronic component in the component receiving area.

* * * * *